United States Patent [19]

Passaniti et al.

[11] Patent Number: 5,378,562
[45] Date of Patent: Jan. 3, 1995

[54] METHOD OF MAKING AIR CATHODE MATERIAL HAVING CATALYTICALLY ACTIVE MANGANESE COMPOUNDS OF VALANCE STATE +2

[75] Inventors: Joseph L. Passaniti; Robert B. Dopp, both of Madison, Wis.

[73] Assignee: Rayovac Corporation, Madison, Wis.

[21] Appl. No.: 190,781

[22] Filed: Feb. 1, 1994

Related U.S. Application Data

[62] Division of Ser. No. 15,641, Feb. 9, 1993, Pat. No. 5,308,711.

[51] Int. Cl.[6] .......................... H01M 4/36; H01M 4/88
[52] U.S. Cl. .......................... 429/224; 429/29; 429/41; 429/44; 252/182.1
[58] Field of Search .............. 429/27, 224, 29, 41, 429/42, 44; 252/182.1

[56] References Cited

U.S. PATENT DOCUMENTS

| | | | |
|---|---|---|---|
| 3,948,684 | 4/1976 | Armstrong | 136/120 |
| 4,197,362 | 4/1980 | Schmidberger et al. | 429/12 |
| 4,256,545 | 3/1981 | Deborski | 204/290 |
| 4,789,561 | 12/1988 | Schäfer et al. | 427/126.1 |
| 4,894,296 | 1/1990 | Borbely et al. | 429/27 |
| 4,906,535 | 3/1990 | Hoge | 429/42 |
| 5,032,473 | 7/1991 | Hoge | 429/42 |

OTHER PUBLICATIONS

"Carbon–Air Electrode With Regenerative Short Time Overload Capacity," Zoltowski et al., Mar. 1973, Journal of Applied Electrochemistry, vol. 3, pp. 271-283.

*Primary Examiner*—John S. Maples
*Attorney, Agent, or Firm*—Thomas F. Woods

[57] ABSTRACT

A method of making an air cathode material for a metal-air cell is provided. In the air cathode material of the present invention, manganese compounds of valence state +2 act as catalysts for the reduction of oxygen, and are distributed substantially evenly throughout a carbon matrix. Manganese compounds of valence state +2 form between carbon particles after the carbon particles are added to an aqueous solution of potassium permanganate.

5 Claims, 5 Drawing Sheets

METHOD OF MAKING AIR CATHODE MATERIAL HAVING CATALYTICALLY ACTIVE MANGANESE COMPOUNDS OF VALANCE STATE +2

This application is a division of application Ser. No. 08/015,641, filed Feb. 9, 1993, now U.S. Pat. No. 5,308,711.

FIELD OF THE INVENTION

This invention relates to alkaline electrochemical cells having metallic anodes and air cathodes, commonly known as metal-air cells. More particularly, this invention relates to the use of potassium permanganate and carbon in preparing an air cathode mix for use in metal-air button cells. Evenly distributed, catalytically active manganese compounds of valence state +2 are provided for in the air cathodes of metal-air cells using the disclosed invention.

BACKGROUND OF THE INVENTION

The recent increase in small electrically-powered devices has increased the demand for very small metal-air electrochemical cells. Such small cells are usually disc-like or pellet-like in appearance, about the size of garment buttons, and generally have diameters ranging up to about 1.0 inch, and heights ranging up to about 0.60 inches. The small size and the limited amount of active material contained in these small metal-air cells results in considerable attention being directed to improving the efficiency and completeness of the power generating electrochemical reactions occurring therein.

Metal-air cells convert atmospheric oxygen to hydroxyl in the air cathode, the hydroxyl then migrating to the anode, where it causes the metal contained therein to oxidize. Usually the anode material in such cells is comprised of zinc.

More particularly, the desired reaction in a metal-air cell air cathode involves the reduction of oxygen, the consumption of electrons, and the production of hydroxyl, the hydroxyl being free to migrate through the electrolyte towards the anode, where oxidation of zinc may thereupon occur. Equation 1 outlines the overall reaction occurring in the air cathode of a metal air cell:

$$4e^- + O_2 + 2H_2O \rightarrow 4OH^-$$

In most metal-air cells, air enters the cell through one or more ports in the cell, the ports being immediately adjacent to the cathode assembly, or being separated from the cathode assembly by an air chamber. In either arrangement, air diffuses into the cathode assembly, and oxygen in the air reacts with water to form hydroxide ions.

The cathode assembly of metal-air cells generally consists of a mixture of activating chemicals supported by a current collecting substrate capable of being connected to electrical circuitry. More particularly, the activating chemicals are typically comprised of carbon and manganese dioxide, and current collecting substratum usually consists of a cross-bonded screen having nickel-metal strands woven therein, or a fine-mesh expanded metal screen.

Two models are commonly forwarded to explain the overall reaction set forth in equation 1: The Adsorbed Species Model and the Free Radical Model. The chains of reactions corresponding to both of these models are set forth below:

| Adsorbed Species Model | Free Radical Model |
|---|---|
| $O_2 \rightarrow 2O_{Ads}$ | $O_2 + e^- \rightarrow O_2^-$. |
| $2O_{Ads} + 2e^- \rightarrow 2O^-_{Ads}$ | $O_2^-. + H_2O + e^- \rightarrow HO_2^- + OH^-$ |
| $2O^-_{Ads} + H_2O \rightleftarrows HO_2^- + OH^-$ | $HO_2^- \rightarrow$ Bulk |
| $HO_2^- + H_2O + 2e^- \rightleftarrows 3OH^-$ | $HO_2^- + H_2O + 2e^- \rightleftarrows 3OH^-$ |

Either model's chain of hypothesized reactions results in the production of peroxides ($HO_2^-$) and hydroxyls ($OH^-$). In metal-air cathodes, peroxide may oxidize back to water and adsorbed oxygen, and act parasitically in respect of the production of hydroxyls from oxygen in the desired reaction. This parasitic effect lowers the voltage produced by conventional metal-air cells.

In the art known heretofore, $MnO_2$, wherein the manganese in the $MnO_2$ compound is of valence state +4, has been used in the carbon matrix to reduce the parasitic effects attending peroxide generation in metal-air cells. The use of manganese having a higher oxidation state, such as manganese (IV) dioxide (where IV denotes valence state +4), manganese (IV) oxide, or manganese (IV) hydroxide, for the reduction of oxygen in a gas diffusion electrode is well known. The introduction of manganese (IV) compounds into the carbon matrix of an air cathode has heretofore required that very finely divided manganese dioxide particles be distributed evenly by mechanical or chemical means throughout the carbon matrix of the air cathode. Heretofore, it has generally been believed that a very finely divided form of manganese dioxide is required for optimum cathode performance.

Numerous prior art disclosures have been made suggesting methods of introducing manganese compounds having a valence state of +4 into the carbon matrix of an air cathode, including:

| Country | Patent Number | Inventor/Applicant | Issue Date |
|---|---|---|---|
| Yugo. | — | Zoltowski et al | 1973 |
| U.S.A. | 3,948,684 | Armstrong | 1976 |
| U.S.A. | 4,256,545 | Deborski | 1981 |
| U.S.A. | 4,894,296 | Borbely et al | 1990 |
| U.S.A. | 4,906,535 | Hoge | 1990 |
| U.S.A. | 5,032,473 | Hoge | 1991 |

Zoltowski et al, in an article entitled "Carbon-air electrode with regenerative short time overload capacity: Part 1—Effect of manganese dioxide," published in the Journal of Applied Electrochemistry, volume 3, pp. 271–283 (1973), disclose the use of potassium permanganate to catalyze activated carbon, wherein most of the permanganate is reduced by the carbon to $MnO_2$, and wherein the manganese in the $MnO_2$ compound is of valence state +4.

Similarly, in U.S. Pat. No. 3,948,684 Armstrong discloses an admixture of potassium permanganate and activated carbon, wherein the potassium permanganate is reduced in situ by heating or by the introduction of hydrogen peroxide to form manganese dioxide.

In U.S. Pat. No. 4,256,545 Deborski discloses the use of potassium permanganate while heating cathodes to between 250° and 700° C. in an oxidizing atmosphere to form $MnO_2$, $Mn_2O_3$, and $Mn_3O_4$.

In U.S. Pat. Nos. 4,906,535 and 5,032,473 Hoge discloses the use of potassium permanganate as a catalyst for carbon black.

In U.S. Pat. No. 4,894,296 Borbely et al disclose the introduction of finely divided gamma $MnO_2$ particles into activated carbon. Because the gamma $MnO_2$ used by Borbely et al is not watersoluble, extensive and expensive milling is required prior to its introduction into the metal-air cell carbon matrix.

The prior art shows that heretofore the uniform introduction of manganese or manganese oxides into the carbon matrix of metal-air cell cathodes has required extensive milling prior to such introduction, or high-temperature heating or chemical treatment after such introduction.

In a metal-air cell having an air cathode containing $MnO_2$ and constructed in accordance with the teachings of the prior art, the $MnO_2$ particles distributed throughout the carbon matrix participate in the oxygen reduction reactions occurring therein. $MnO_2$ particles act then not merely as chemical catalysts, but as electrochemical catalysts in metal-air cells. As a result of their electrochemical activity, the physical dimensions of the $MnO_2$ particles change as the chemical composition of those particles changes to $Mn_2O_3$, and possibly other species, upon cell discharge.

During non-discharge or rest periods, the particles of manganese-containing species derived from $MnO_2$ particles during cell discharge change back to $MnO_2$ particles as a result of oxygen oxidation reactions. Through successive discharge-rest period cycles, and as a result of the repeated cycles of particle expansion and contraction corresponding therewith, the relatively inelastic carbon matrix surrounding the $MnO_2$ particles becomes permanently deformed, and new void spaces are created between the $MnO_2$ particles and the carbon matrix. These new void spaces may cause the air cathode material to lose mechanical integrity because of a reduction in the internal pressure exerted on the Teflon ® gasket interposed between the air cathode and the cell container. In consequence of the reduction in cell internal pressure, the Teflon ® seal may rupture, and electrolyte may leak from the cell. Metal-air cells having air cathodes containing $MnO_2$ particles may therefore have a shorter service life than would otherwise be indicated by the electrochemical capacity of the cell; the service life of such a cell may be attenuated by mechanical failure of the teflon seal before the electrochemical capacity of the cell is exhausted.

Therefore, it is an object of the present invention to introduce catalytically active manganese compounds uniformly and easily into the carbon matrix of an air cathode.

It is another object of the present invention to introduce into the carbon matrix of an air cathode a manganese-containing water-soluble compound that will reduce in situ to form catalytically active non-soluble manganese-containing compounds without any heat or additional chemical treatment steps.

It is yet another object of the present invention to introduce into the carbon matrix of an air cathode a manganese-containing water-soluble compound that will reduce in situ to form catalytically active but essentially electrochemically neutral manganese compounds.

It is yet another object of the present invention to provide for metal-air cells having air cathodes of improved mechanical integrity and increased service life.

A still further object of the present invention is to provide for metal-air cells having high current densities and high closed circuit voltages.

Other objects and advantages will become apparent from the detailed description of the invention.

SUMMARY OF THE INVENTION

Some of the objects of the invention are attained in an electrochemical cathode for a metal-air cell having a metal anode. Such a cathode has a current collecting substrate, an active layer comprising an admixture of carbon and manganese compounds, where the active layer and current collecting substrate form a current collecting sublaminate. A barrier layer is disposed on a first side of the current collecting sublaminate, and an air diffusion layer is disposed on the second side of the current collecting sublaminate. The manganese compounds in such an electrochemical cathode are substantially all of valence state +2.

Preferably, a metal-air cell having such an electrochemical cathode has a zinc anode and an alkaline electrolyte. The current collecting substrate is preferably a woven-nickel metal screen, and less preferably an expanded nickel-metal screen. Carbon particles are disposed on the screen to form a carbon matrix throughout which the manganese compounds of valence state +2 are distributed evenly, the carbon particles having surface areas exceeding 50 $m^2/g$, and most preferably having a range between about 1000 $m^2/g$ and 1150 $m^2/g$. In its most preferred embodiment, the barrier layer is comprised of polypropylene, the air diffusion layer is comprised of PTFE, and a PTFE binder is distributed evenly throughout the active layer. The invention also comprehends a metal-air cell having such an electrochemical cathode.

Other objects of the invention are attained in an air cathode material comprising, as electrochemically or chemically reactive components thereof, carbon and manganese compounds substantially all of valence state +2.

Still other objects of the invention are attained in a composition of matter comprising carbon and manganese compounds substantially all of valence state +2.

Yet other objects of the invention are attained in a method of making an air cathode material comprising the steps of combining potassium permanganate and water, mixing carbon particles into the solution to form a reaction mixture, and reacting the mixture at room temperature to form a reaction product of carbon particles and manganese compounds substantially all of valence state +2. Additional steps are comprehended in the invention such as heating the reaction product at temperatures between about 100° C. and 140° C., carrying out the mixing step for at least five minutes, or adding a dispersant to the reaction mixture.

Further objects yet of the invention are attained in a method of making an air cathode layer comprising the steps of combining potassium permanganate and water, mixing carbon particles into the solution to form a reaction mixture, and reacting the mixture at room temperature to form a reaction product of water, carbon particles, and manganese compounds substantially all of valence state +2. The reaction product is filtered and heated until a dry cake is produced. The cathode material is mixed at the speed and temperature required to make the cathode material free-flowing. Thereafter, the cathode material is rolled into an active layer sheet having a first side and a second side, and a current collecting substrate sheet is laminated onto the first side. Next, a barrier layer sheet is laminated onto the first side of the active layer sheet, and an air diffusion layer sheet is laminated onto the second side of the active layer sheet.

DETAILED DESCRIPTION OF THE PREFERRED EMBODIMENTS

While those skilled in the art will recognize that the present invention is applicable to air cathodes and air cathode materials for all types of metal-air electrochemical cells, the particular embodiment of the invention set forth herein relates to an electrochemical metal-air cell having a zinc anode, an alkaline electrolyte, and an air cathode containing carbon.

In the present invention, it was discovered that potassium permanganate could be introduced into a carbon matrix, and thereafter react in situ at room temperature to form non-soluble, catalytically-active manganese compounds. No further heat or chemical treatment steps were required.

The carbon used in the present invention reduces the potassium permanganate to compounds containing manganese of valence state +2 (hereinafter "manganese (II)"). Surprisingly, it has been discovered that valence state +2 manganese compounds in combination with carbon act successfully as catalysts for the reduction of oxygen in air cathodes. As a result of the in situ reactions, catalytically active manganese (II) compound particles form in the carbon matrix of zinc-air cells constructed in accordance with the present invention.

The reduction of the parasitic effects attending the generation of peroxide provided by $MnO_2$ or manganese (IV) in prior art metal-air cells is provided for in the present invention by manganese (II) compounds. When these compounds are present in the carbon matrix of an air cathode, voltage levels produced by zinc-air cells so constructed increase with respect to those measured in cells having no manganese compounds in the carbon matrix.

In its preferred embodiment the present invention uses pulverized carbon particles having a surface area exceeding 50 $m^2/g$, preferably exceeding 250 $m^2/g$, more preferably between about 250 and 1500 $m^2/g$, even more preferably between about 700 and 1400 $m^2/g$, even more preferably yet between about 900 and 1300 $m^2/g$, and most preferably between about 1000 and 1150 $m^2/g$.

In its most preferred embodiment, the carbon of the present invention has the following characteristics: surface area between about 1000 and 1,150 $m^2/g$, an apparent density of about 0.51 g/cc, a real density of about 2.1 g/cc, a pore volume of about 0.90 $g/c^3$, a specific heat at 100 degrees Celsius of about 0.25, and about 65 to 75% of such material will pass through a wet −325 U.S. mesh screen. Such preferred carbon is known as PWA activated carbon, and is available from the Activated Carbon Division of the Calgon Corporation, Pittsburgh, Pa.

A range of carbon particle sizes is required for successful processing of the air cathode material. Particle size is measured using a laser light scattering technique as, for example, that provided by using a Model 7991 Microtrak (registered trademark) Particle-Size Analyzer manufactured by Leeds & Northrup.

Figure 1:
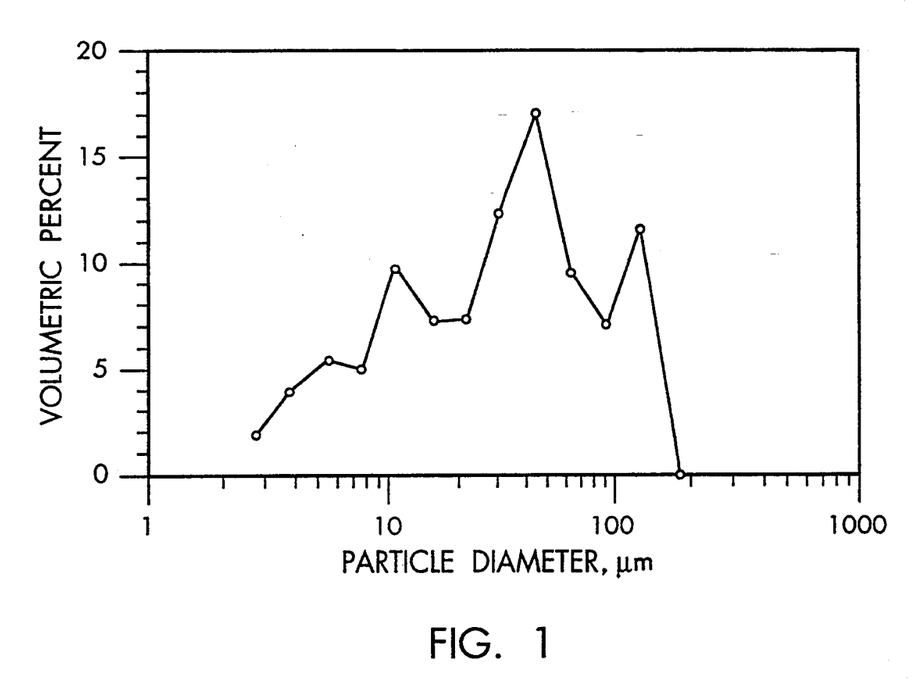
FIG. 1 is a graph showing the size distribution of the carbon particles of this invention.

The preferred, typical particle sizes of PWA carbon particles used in this invention are given numerically in Table 1, and are illustrated graphically in FIG. 1. As illustrated, PWA activated carbon particles used in the present invention have sizes ranging primarily between about 4 microns and about 125 microns, with about 70% by volume having particle sizes between 16 microns and 125 microns, about 40% by volume having particle sizes between 31 microns and 62 microns, and a small fraction of about 6% by volume having particle sizes less than 4 microns.

TABLE 1

| Microtrak Particle Size Analysis of PWA Activated Carbon Particles | |
|---|---|
| Diameter, Microns | Volumetric Percent |
| 125–176 | 0.0 |
| 88–125 | 11.8 |
| 62–88 | 7.1 |
| 44–62 | 9.7 |
| 31–44 | 17.1 |
| 22–31 | 12.4 |
| 16–22 | 7.4 |
| 11–16 | 7.3 |
| 7.8–11 | 10.0 |
| 5.5–7.8 | 5.1 |
| 3.9–5.5 | 5.6 |
| 2.8–3.9 | 4.1 |
| 0.0–2.8 | 2.0 |

During processing of the air cathode material of this invention, some mechanical integrity of the air cathode mix is required so that it can be rolled and cut. Polymeric halogenated hydrocarbon binders are therefore distributed substantially evenly throughout the admixture of carbon particles and manganese compound particles, and upon subsequent rolling and pressing such binders will form an interlocking web of fibrillated fibers, the web imparting the desired physical integrity to the air cathode mix. It was discovered that the binder having the best such webbing characteristics was polytetrafluouroethylene (PTFE), and that the optimum amount of PTFE to add to the air cathode mixture was 12% by dry weight of the cathode mixture of carbon particles and binder material.

To make the cathode material of the present invention, 1000 milliliters of distilled water are placed in a non-reactive container, and 19 grams of $MnO_4$ are added thereto. This solution is mixed for ten minutes before 204 grams of PWA activated carbon having the appropriate particle sizes set forth above are added slowly to the central mix vortex. After ten minutes of further mixing, 51 grams of Teflon (R) T-30 dispersant, Teflon being a registered trademark of dupont, are added slowly, uniformly, and without interruption to the edge of the mix vortex, and mixing is continued for yet another ten minutes at the speed required to maintain a vortex in the mix after the Teflon (R) dispersant is added. The resulting solution is filtered through Whatman #1 or equivalent filter paper, and then heated to between 100° C. and 140° C., in a mechanical convection drying oven for at least 16 hours, or until dry, to yield a cake of cathode material of the present invention.

To make an air cathode layer for a zinc-air cell having the present invention incorporated therein, the dry cathode material set forth above, 3 grams of Black Pearls 2000 carbon black, and 5 grams of pre-densified cathode mix from previous manufacturing runs, are placed in a Model W10-B Littleford Lodige High Intensity Mixer, and mixed at 2600 rpm at a temperature between about 80° C. and 100° C. for 30 minutes, or until any agglomerates in the mix separate and the mix becomes free flowing. The resulting cathode mix is rolled into an active layer sheet between about 0.007 and about 0.15 inches thick using conventional stainless steel roller mills of appropriate spacing, the active layer sheet having a first side and a second side.

A current collecting substrate sheet of woven nickel metal screen is then laminated onto the first side of the active layer sheet, thereby providing a current collector for an air cathode of the present invention. The woven nickel metal screen of the present invention is most preferably of 40 mesh size, and is manufactured by National Standard of Corbin, Kent. Alternatively, the screen may be comprised of silver, platinum, other suitable metals or metal alloys, or may be comprised of expanded nickel metal screen, 3 Ni 5-050 Pulled, available from the Delker Corporation of 16 Commercial Street, Branford, Conn., 06405. Next, a barrier layer sheet comprised of micro-porous plastic (most preferably polypropylene) is laminated primarily by adhesive and secondarily by pressure means onto the first side of the active layer sheet. Finally, a porous hydrophobic polymeric polytetrafluoroethelyne (PTFE) sheet, or air diffusion sheet, having a porosity capable of limiting current produced by a cell so constructed to about 100 mA/cm$^2$, is laminated by pressure means only onto the second side of the active layer sheet. Once the layers are bonded, the resulting laminate is cut to size to provide the individual air cathodes.

The features and advantages of the present invention will become apparent in the following examples. The following examples of the present invention, however, are intended to be merely illustrative, and the present invention is not intended to be limited thereto.

EXAMPLE A

Figure 2:
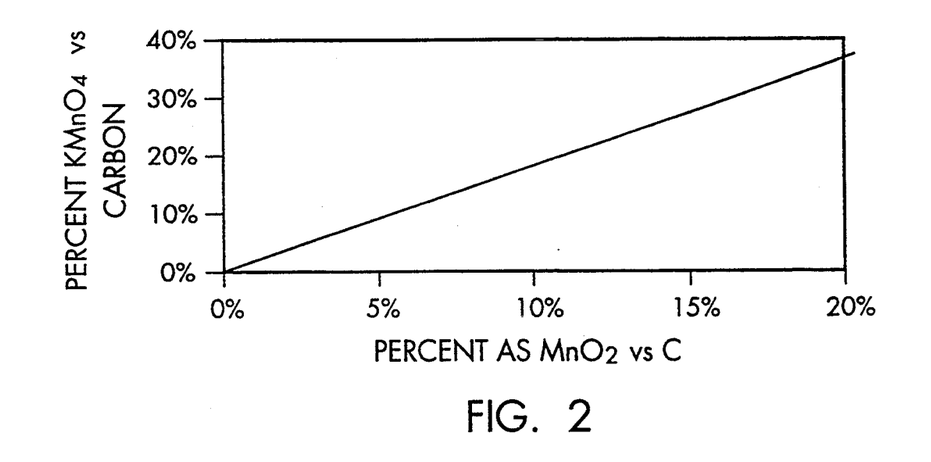
FIG. 2 is a graph normalizing the concentrations of manganese in the cathode.

In the prior art the introduction of potassium permanganate into the carbon matrix of metal-air cells has led to the reduction of the potassium permanganate into mostly $MnO_2$, wherein the manganese in the $MnO_2$ compound has a valence state of +4. $MnO_2$ has thus become a standard catalyst, and it has become common for those skilled in the art to express the amounts of potassium permanganate so added in terms of equivalent amounts of $MnO_2$ versus carbon. FIG. 2 shows how the amount of potassium permanganate added to an air cathode versus carbon weight of the present invention may be translated into an equivalent amount of added $MnO_2$ versus carbon weight.

Table 2 shows the results of wet chemical analyses carried out on air cathode samples containing PWA activated carbon, as treated with potassium permanganate at 0%, 10% and 20% loading as a percent of $MnO_2$ versus carbon. The same analyses were performed on cell cathode material from a conventional AA alkaline cell having carbon black and battery-grade $MnO_2$ contained therein. The amounts of manganese (II) compounds and manganese (III) compounds present by weight in the tested samples and the equivalent amounts predicted by theoretical calculations are shown in Table 2.

TABLE 2

| Cathode Composition | AMOUNTS OF MANGANESE (II), (III) AND (IV) MEASURED IN CATHODE SAMPLES | | | | |
|---|---|---|---|---|---|
| | Calculated Total Mn | Measured Total Mn | Mn(II) | Mn(III) | Mn(IV) |
| Activated Carbon Only | 0.00% | <0.02% | <0.02% | <0.02% | <0.02% |
| Activated Carbon + KnMnO$_4$; 10% Loading as MnO$_2$ | 4.30% | 4.26% | 4.29% | <0.02% | <0.02% |
| Activated Carbon + KnMnO$_4$; 20% Loading as MnO$_2$ | 8.06% | 7.08% | 7.04% | <0.02% | <0.02% |
| Alkaline AA Cell Cathode With Carbon Black and Battery-Grade MnO$_2$ | 51.80% | 52.54% | 4.82% | 2.64% | 45.08% |

In Table 2 and hereafter, manganese compounds of valence state +2 are referred to as Mn(II) (or manganese (II)), and manganese compounds of valence state +3 are referred to as Mn(III) (or manganese (III)). Table 2 shows that the amounts of manganese determined by wet chemistry methods coincide closely with those predicted by theoretical calculations. Indeed, after allowing for reasonable ranges of expected error in experimentally determined results, the amounts of manganese compounds determined using wet chemistry analytical methods essentially match those predicted by theory. Threshold detection limits inhered in the wet chemistry methods used to derive the results set forth in Table 2. Those limits were 0.02%, meaning that manganese concentrations lower than 0.02% could not be measured by the wet chemistry detection means used. Table 2 demonstrates that air cathodes of the present invention having carbon treated with potassium permanganate contain essentially no $MnO_2$ (e.g., less than 0.02% $MnO_2$ was detected in such air cathodes).

Table 2 also demonstrates that air cathodes made in accordance with the present invention contain manganese compounds that are substantially all (e.g., at least 99.8%) of valence state +2. Table 2 further demonstrates that air cathodes made in accordance with the present invention, unlike those of the prior art, contain substantially no manganese compounds of valence state +3 or +4 (e.g., less than 0.02% manganese (III) and less than 0.02% manganese (IV) were detected in air cathodes of the present invention).

EXPERIMENTAL METHODS—EXAMPLE A, PART 1

The total amount of manganese and the amount of manganese having valence state +2 or potentially +3 (e.g., manganese (II) and manganese (III), respectively) were determined by acid extraction of the samples followed by redox titrations. The amount of manganese of valence state +4 was determined using equation 2:

Total $Mn - Mn(II) - Mn(III) = Mn(IV)$, where Mn(IV) is manganese of valence state +4.

The total amount of manganese of all oxidation states present in the air cathode after being treated with potassium permanganate was determined as follows. Fifty milliliters of concentrated hydrochloric acid were placed in a beaker containing a 0.5 gram sample of the air cathode. The sample was heated to spot dryness, cooled, and 10 milliliters hydrochloric acid were added. The resulting solution was boiled for ten minutes, then cooled and filtered. After removing the insoluble fraction of the solution containing carbon, binder, and the like, the filtrate was diluted with 300 milliliters of distilled water. Then 50 grams of sodium pyrophosphate were stirred and dissolved into the solution to prevent $MnO_2$ from precipitating out of solution during titration. The pH of the titration solution was adjusted to between 6.5 and 7.0. Next the sample was titrated with a 0.025 N potassium permanganate solution to a 400 mV endpoint. The total percentage of manganese present by weight in the sample was determined using equation 3:

$$\text{Total \% Mn} = \left( \frac{(\text{ml KMnO}_4)(\text{N KMnO}_4)}{1000} \right) \times$$

$$\left( \frac{1 \text{ mole KMnO}_4}{5 \text{ eq. KMnO}_4} \right) \times \left( \frac{4 \text{ Moles Mn}}{1 \text{ mole KMnO}_4} \right) \times$$

$$\left( \frac{54.938 \times 100}{\text{Sample Weight}} \right)$$

where N is normality, eq. is equivalents, and 54.938 is the molar weight of manganese.

EXPERIMENTAL METHODS—EXAMPLE A, PART 2

The amount of manganese (II) present in the air cathode after being treated with potassium permanganate was determined as follows. Fifty milliliters of 1:1 sulfuric acid were placed in a beaker, and 15 grams of sodium pyrophosphate were added prevent any manganese (III) present in the solution from converting into manganese (II) or manganese (IV). Sodium pyrophosphate in the solution was dissolved by heating the solution to 80° C. After heating, 0.5 grams of air cathode material were stirred into the solution, and the solution was heated at 80° C. for four hours. Next, the solution was cooled and filtered into a 100 milliliter volumetric flask. A 50 milliliter aliquot of the solution was then removed from the 100 milliliter flask, and placed in a 400 milliliter beaker. The resulting filtrate was then treated with 5 ml of 1:1 sulfuric acid and about 15 additional grams of sodium pyrophosphate, the sodium pyrophosphate being used to prevent manganese (IV) from precipitating out of the solution during titration. The contents of the beaker were stirred until they dissolved, and the pH of the titration solution was adjusted to between 6.5 and 7.0. The sample was then titrated with a 0.025 N standard potassium permanganate solution to a 400 mV endpoint. The percentage of manganese (II) present by weight in the sample was determined using equation 5:

$$\text{Total \% Mn(II)} = \left( \frac{(\text{ml KMnO}_4)(\text{N KMnO}_4)}{1000} \right) \times$$

$$\left( \frac{1 \text{ mole KMnO}_4}{5 \text{ eq. KMnO}_4} \right) \times \left( \frac{4 \text{ Moles Mn(II)}}{1 \text{ mole KMnO}_4} \right) \times$$

$$\left( \frac{54.938 \times 100}{\text{Sample Weight}} \right) \times \left( \frac{50 \text{ ml}}{100 \text{ ml}} \right)$$

EXPERIMENTAL METHODS—EXAMPLE A, PART 3

Determining the amount of manganese (III) present in the air cathode after it was treated with potassium permanganate required more steps. It is well known in the art that manganese (III) compounds are unstable in an aqueous solution and will therefore convert to manganese (II) and manganese (IV) shortly after forming, as demonstrated by equation 6:

Some of the manganese (II) detected in an aqueous solution, hence, may be the result of manganese (III) having converted to manganese (II).

The first step in measuring the amount of manganese (III) in the air cathode material required that the total amount of manganese (II) present in a first solution be measured, where the first solution contained the air cathode material, sulfuric acid, and pyrophosphate, the pyrophosphate preventing any manganese (III) present in the first solution from converting to manganese (II). Here, the amount of manganese (II) measured above in Part 2 of Example A was used as the amount of manganese (II) measured in the first solution (referred to hereafter as Mn(II)$_{solution\ 1}$).

In the second step, the same procedure outlined in the first step was duplicated, but no pyrophosphate was added to an otherwise identical second solution. The amount of manganese (II) present in the second solution was then measured (referred to hereafter as Mn(II)$_{solution\ 2}$). Because no pyrophosphate was present in the second solution, some of the manganese (III) converted to equal amounts of manganese (II) and manganese (IV). Hence, the amount of manganese (II) measured in the second solution was greater than that measured in the first solution. Because equal amounts of manganese (II) and manganese (IV) were created by the conversion of manganese (III) thereto (see equation 6 above), twice the difference between Mn(II)$_{solution\ 1}$ and Mn(II)$_{solution\ 2}$ yielded the total amount of manganese (III) which converted to manganese (II) and manganese (IV) in the second solution (referred to hereafter as Mn(III)$_{solution\ 2}$).

The third step in measuring the total amount of manganese (III) present in the air cathode material required that the excess amount of iron sulphate be combined with the aliquot of the second solution to form a third solution. Equation 7 shows that manganese (III) reacts with iron of valence state +2 in a one-to-one conversion reaction to produce manganese (II) and iron of valence state +3:

$$Mn(III) + Fe(II) \rightarrow Mn(II) + Fe(III)$$

The amount of manganese (III) present in the second solution, therefore, after some of the manganese (III) converted to manganese (II) and manganese (IV), was determined by titrating the third solution against potassium permanganate, titrating the third solution against potassium permanganate, titrating a blank solution containing only iron sulfate and no air cathode material against potassium permanganate, and taking the difference between the third solution and the blank sample to yield the amount of manganese (III) remaining in the third solution (hereafter referred to as Mn(III)$_{solution\ 3}$). Thus, the total amount of manganese (III) present in the air cathode material was determined using equation 8:

Total % $Mn(III)$ = % $Mn(III)_{solution\ 3}$ + 2(% $Mn(II)_{solution\ 2}$ − % $Mn(II)_{solution\ 1}$)

Equation 8, in turn, is based on equation 9, where the titration reaction is governed by:

$$MnO_4 + 8H^+ + 5Fe(II) \rightarrow Mn(II) + 4H_2O + 5Fe(III)$$

The amount of manganese (III) present in the air cathode after being treated with potassium permanganate, therefore, was determined as follows. The total amount of manganese (II) present in the sample was assumed to be equal to Mn(II)$_{solution\ 1}$.

For the second step, 50 milliliters of 1:1 sulfuric acid were placed in a beaker, and 0.5 grams of air cathode material were stirred into the solution, followed by heating at 80° C. for four hours. The resulting solution was filtered, and the filtrate was placed in a 100 milliliter volumetric flask. A 25 milliliter aliquot of the filtrate was treated with 5 milliliters of 1:1 sulfuric acid, followed by 15 crams of sodium pyrophosphate being added to the solution to form the second solution. The pH of the titration solution was adjusted to between 6.5 and 7.0, and the amount of manganese (II) in the second solution was measured by titration against standard potassium permanganate to yield Mn(II)$_{solution\ 2}$.

In the third step, another 25 milliliter aliquot was taken from the filtrate solution and placed in a 400 milliliter beaker, and diluted with distilled water to yield 200 milliliters of solution. Then 25 milliliters of 0.01M FeSO$_4$ having a concentration of 2.78 g/L were added to form a third solution. FeSO$_4$ not consumed by manganese (III) in solution was titrated against a 0.025 N standard potassium permanganate solution to a 400 mV endpoint. A blank control sample having the same amount of FeSO$_4$, but no cathode material, was run through the same procedure and titrated against a 0.025 N standard potassium permanganate solution to a 400 mV endpoint. The difference between the blank sample and the amount of iron sulphate measured in the third solution yielded Mn(III)$_{solution\ 3}$, according to equation 10:

% Mn(III)solution 3 = ((ml KMnO$_4$, Blank − ml KMnO$_4$, Sample)(N KMnO$_4$)(1 mole KMnO$_4$)) ×

$$\left(\frac{54.938}{1000}\right) \times \left(\frac{100\ ml}{25\ ml}\right) \times \left(\frac{100}{Sample\ Weight}\right)$$

EXAMPLE B

Figure 3:
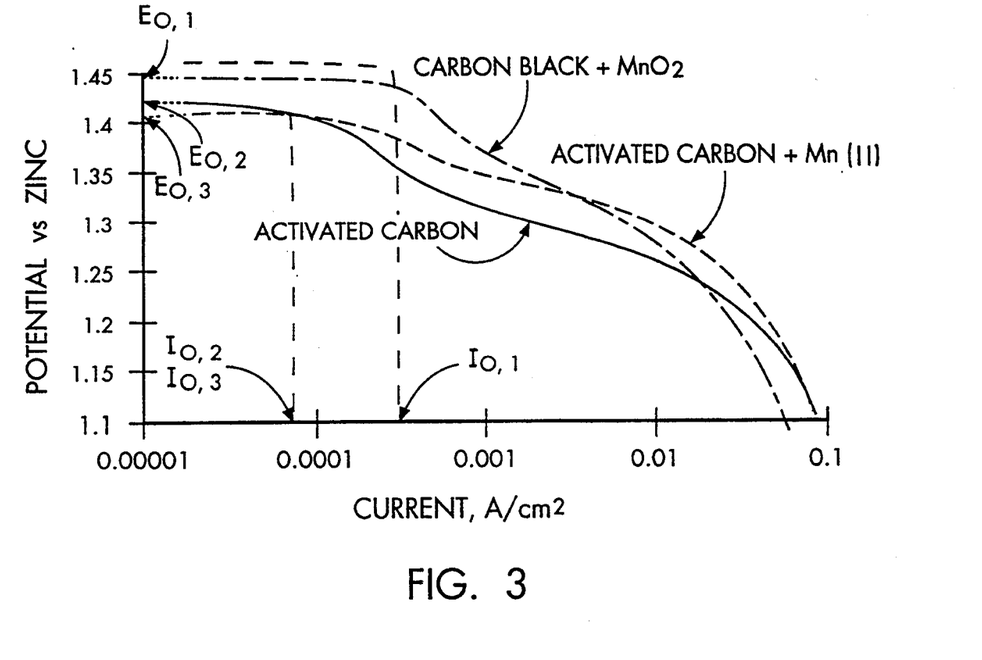
FIG. 3 is a comparison of cell voltammograms for a conventional cell, a cell made according to the present invention, and a cell having no manganese catalyst in the air cathode.

FIG. 3 shows voltammograms of the current density measured under varying potentials for three test cathodes: (1) Carbon Black+MnO$_2$ (Test Electrode 1), (2) Activated Carbon (Test Electrode 2), and (3) Activated Carbon +Mn(II) (Test Electrode 3). The Carbon Black+MnO$_2$ curve represents the results obtained using a cathode having a carbon matrix consisting of Black Pearls 2000 carbon black from Cabot Corporation, and having finely divided ganuna manganese dioxide powder distributed evenly therethrough. The Activated Carbon curve represents the results obtained using a cathode having a carbon matrix consisting of PWA activated carbon, and having no introduced manganese compounds. The Activated Carbon+Mn(II) curve represents the results obtained using a cathode having a carbon matrix consisting of PWA activated carbon, and having manganese (II) compounds distributed evenly therethrough, potassium permanganate having been used to introduce such manganese (II) compounds into the carbon matrix in accordance with the present invention.

In FIG. 3 the exchange potentials and exchange current densities of the three test electrodes are denoted by the labels $E_{o,1}$, $E_{o,2}$, and $E_{o,3}$, and $I_{o,1}$, $I_{o,2}$, and $I_{o,3}$, respectively. Potential versus current density was measured for each of the three test electrodes under typical atmospheric temperature, humidity, and oxygen concentration conditions. Potentials relative to a zinc reference electrode were measured, and the current density was then plotted on a log scale. All three test electrodes were driven slowly from equilibrium to perturbed cathodic states to approximate steady state conditions.

Because Test Electrode 2 contained no introduced manganese or other introduced catalysts, its exhibited potential was that due essentially to the reduction of oxygen alone. The potential exhibited by Test Electrode 1 included effects related to the presence of the higher valence states of manganese in the carbon matrix, such as manganese (IV) or manganese dioxide. Note that the exchange potential for Test Electrode 1 was higher than that for Test Electrodes 2 and 3. While the higher exchange potential of Test Electrode 1 was desirable, the steep Tafel slope exhibited by Test Electrode 1 as current drain increased beyond the exchange potential point was not because it indicated that the oxygen reduction reactions occurring therein were poorly catalyzed.

The more efficient and complete the catalysis occurring in the air cathode of a metal-air cell, the greater the capacity provided by the active material in such a cell. The catalytic efficiency of air cathodes in metal-air cells relates directly, therefore, to the discharge voltage of metal-air cells. Test Electrodes 2 and 3, while exhibiting lower exchange potentials, also exhibited more gentle Tafel slopes than did Test Electrode 1, indicating that Test Electrodes 2 and 3 catalyzed the oxygen reduction reactions occurring therein more completely than did Test Electrode 1.

As current drains increased above the exchange current density, Test Electrode 2 began to operate at potentials only marginally acceptable in metal-air cells intended for sale in the consumer market. Test Electrode 3 overcame the low-potential problems inhering in Test Electrode 2. Over the full range of tested current densities, Test Electrode 3 operated at potentials higher than those exhibited by Test Electrode 2, and within a range acceptable for metal-air cells intended for sale in the consumer market.

FIG. 3 shows that the Tafel slopes of Test Electrodes 2 and 3 were nearly identical. Test Electrodes 2 and 3 also exhibited nearly identical exchange potentials. The voltammogram curve for Test Electrode 3, therefore, appeared merely to be shifted to the right in respect of the voltammogram curve for Test Electrode 2. This shift indicated that the difference in performance between Test Electrode 2 and Test Electrode 3 may have arisen because the carbon matrix in Test Electrode 3 had an increased amount of surface area available for catalysis relative to the carbon matrix of Test Electrode 2.

EXAMPLE C

Figure 4:
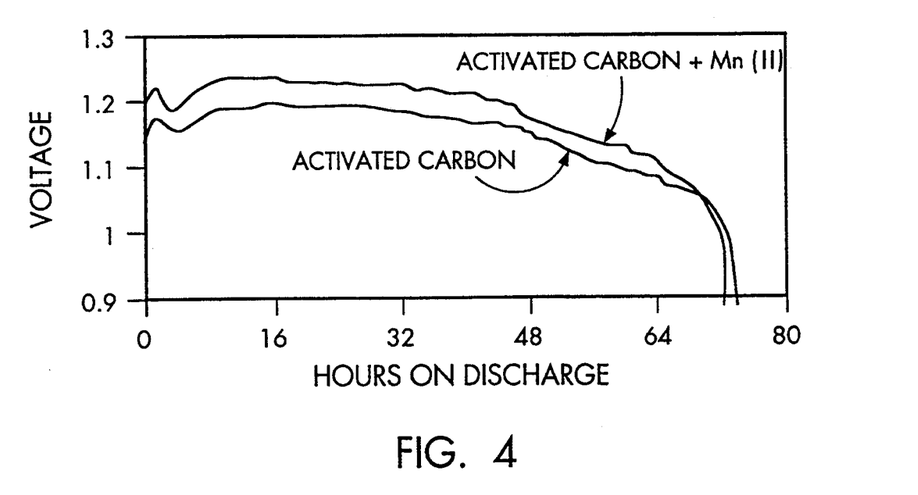
FIG. 4 is a comparison of cell discharge curves for a cell made according to the present invention, and a cell having no manganese catalyst in the air cathode.

FIG. 4 shows a comparison of cell discharge curves for (1) a cell made according to the present invention, and (2) a cell having no manganese catalyst introduced into the air cathode. The cell made according to the present invention contained manganese (II) compounds that were the equivalent of 5% by weight of $MnO_2$ versus carbon. Both cells were subjected to a constant 375 ohm load, or a current density drain of about 12 milliamperes/cm$^2$. FIG. 4 shows that the cell having the manganese (II) compounds produced an output voltage averaging about 40 mV higher than the output voltage produced by the cell having no manganese compounds.

Figure 5:
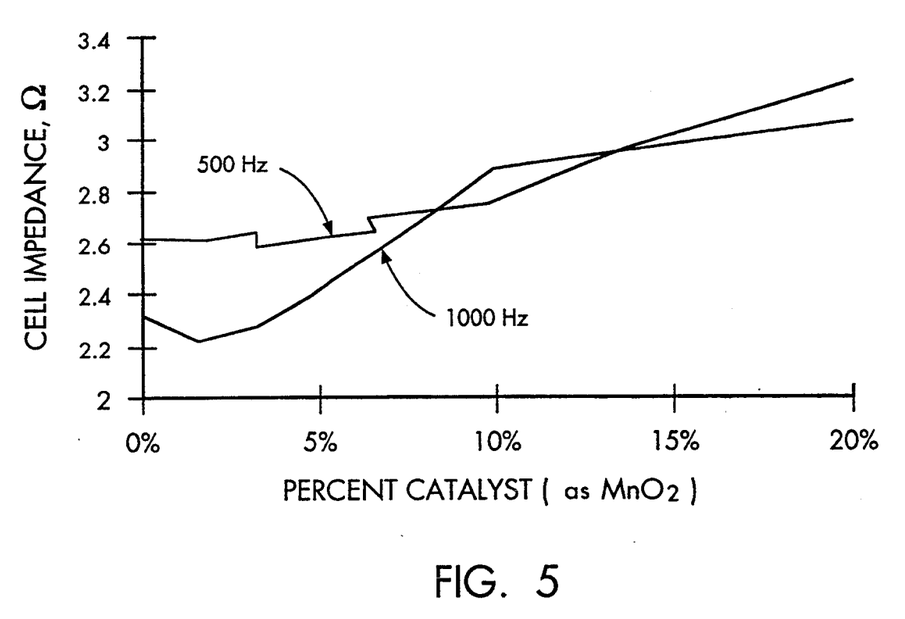
FIG. 5 is a comparison of cell impedance versus $MnO_2$ loading levels as measured at 500 Hz and 1000 Hz.
Figure 6:
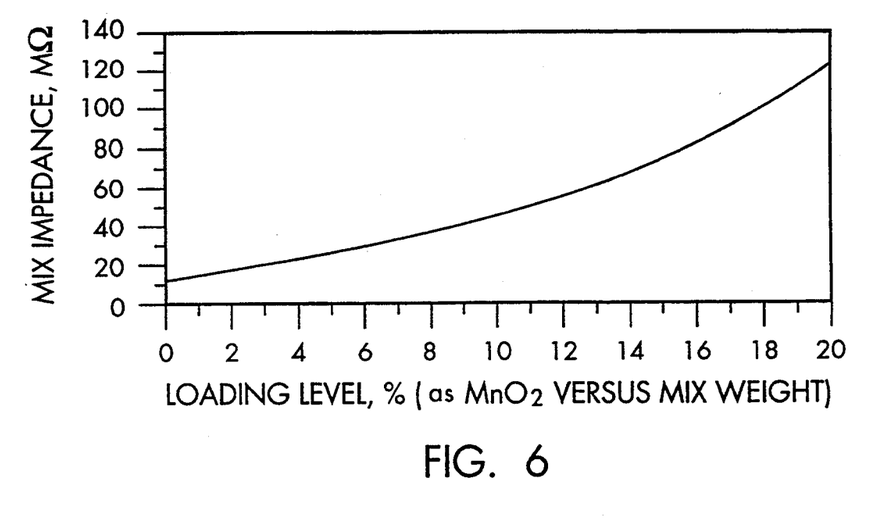
FIG. 6 is a comparison of air cathode mix impedance versus $MnO_2$ loading levels.

It was discovered that 5% loading of potassium permanganate by percent equivalent $MnO_2$ versus carbon provided the best results for air cathode material made in accordance with the present invention. FIG. 5 shows that at loading levels exceeding 5% loading as a percentage of $MnO_2$ versus carbon, or in excess of 10% by weight of potassium permanganate versus carbon (see FIG. 2), cell impedance rose substantially. FIG. 5 shows the cell impedance measured at 500 and 1000 Hz as the percent loading of potassium permanganate increased—5% loading of potassium permanganate provided optimum results because at higher loading levels cell impedance increased, and at lower levels the invention became inoperative. FIG. 6 shows how the impedance of uncompacted cathode mix of the present invention varied as the loading level increased. Again, 5% loading provided approximately optimum results because mix impedance rose steadily above 5%, and the invention became inoperative at levels slightly lower than 5%.

EXAMPLE D

Figure 7:
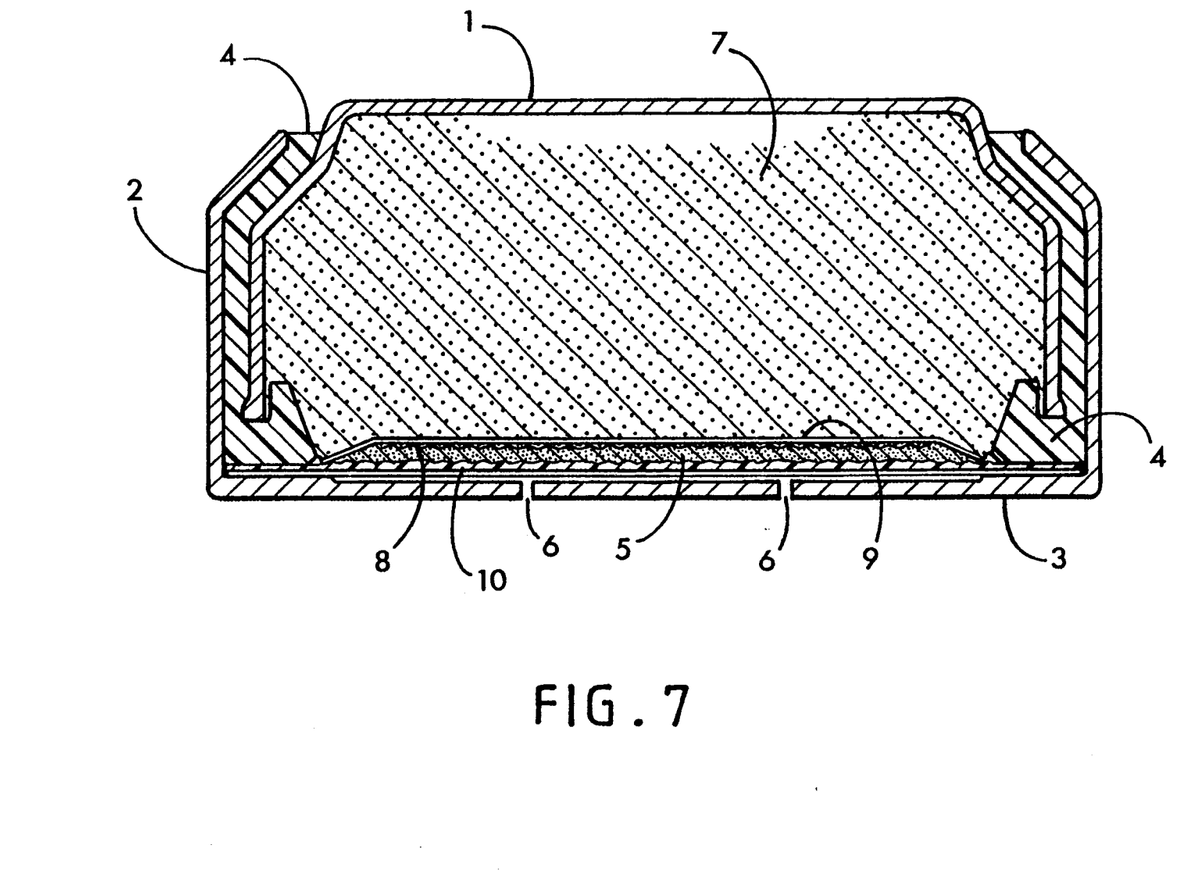
FIG. 7 is a cross-section of a a zinc-air cell of the present invention.

FIG. 7 shows a cross section of a zinc-air cell of the present invention. Negative electrode 1 is electrically insulated from positive electrode 2 by nylon seal 4. Positive electrode 2 has sidewalls contiguous with can bottom 3, perforated therethrough by air ingress holes 6. Air cathode 5 is interposed between can bottom 3 and anode 7. Anode 7 is comprised of a mixture of zinc powder and electrolyte, the electrolyte further comprising about 2% zinc oxide, 68% water, and 30% potassium hydroxide.

Figure 8:
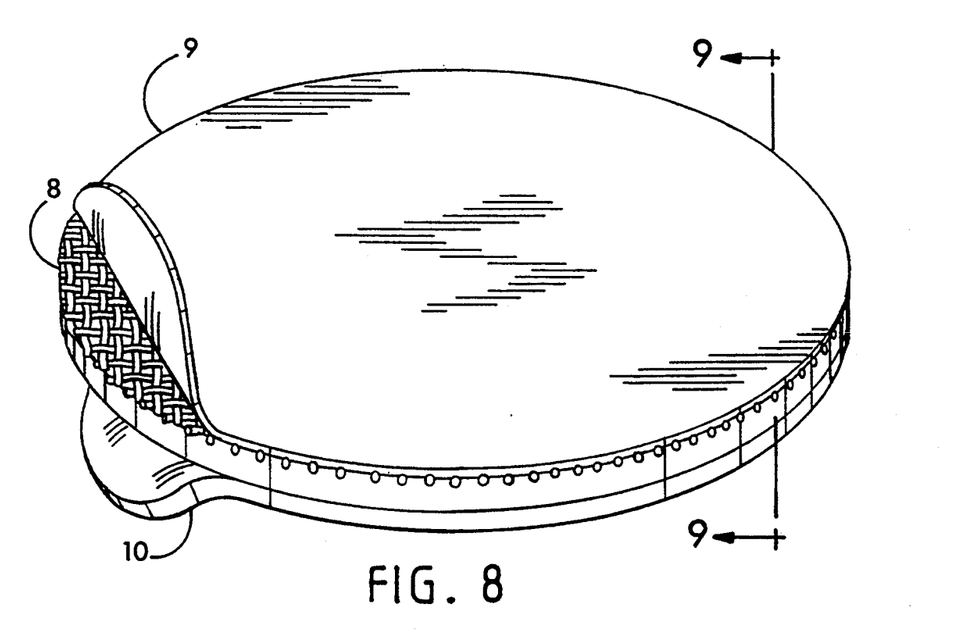
FIG. 8 is perspective view of the air cathode of the present invention.

FIG. 8 shows a perspective view of the air cathode of the present invention. Active layer 8 is sandwiched between barrier layer 9 and air diffusion layer 10. Active layer 8 ranges preferably between about 0.002 and 0.05 inches, more preferably between about 0.006 and 0.02 inches, and most preferably between about 0.007 and 0.009 inches in thickness. The thickness of the active layer selected in the present invention depends on the desired application and method of manufacture. Barrier layer 9 is a micro-porous plastic membrane about 0.001 inches thick, comprised most preferably of polypropylene, and having the primary function of preventing anodic zinc particles from coming into physical contact with the air cathode material. Barrier layer 9, however, also permits the passage of hydroxyl ions and water therethrough. PTFE layer 10 is a micro-porous hydrophobic polymeric membrane about 0.004 inches thick which permits the passage of air therethrough at a controlled rate, and which most preferably limits the current density produced by the cell to a maximum of about 100 milliamperes/cm$^2$. Air diffusion layer 10 is also impervious to battery electrolyte, and is comprised of PTFE in the most preferred embodiment of the present invention. In commercial embodiments of the present invention, an additional air diffusion layer may be disposed between air diffusion layer 10 and can bottom 3.

In a cell constructed according to the present invention, a polymeric halogenated hydrocarbon binder is usually distributed substantially evenly throughout the active layer. Most preferably, such binder is PTFE and comprises about 12% by dry weight of the active layer mixture of carbon particles and PTFE binder contained in the active layer.

Figure 9:
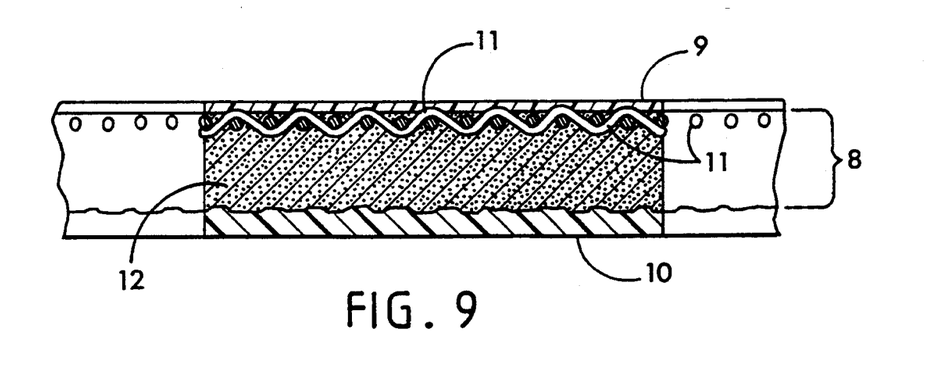
FIG. 9 is an enlarged perspective view of the air cathode of the present invention.

FIG. 9 is an enlarged perspective view of the air cathode of the present invention. Active layer 8 is further comprised of a current collecting substrate capable of being connected to electrical circuitry, conductive woven nickel wire layer 11. Carbon 12 forms a matrix surrounding conductive nickel metal layer 11. Nickel wire layer 11 is comprised of nickel wire because nickel exhibits little or no corrosion in the alkaline environment of the zinc-air cell of the present invention, and also because is is an excellent electrical conductor. Oxygen reacts to form hydroxyl at the site of carbon 12. To catalyze the oxygen-to-hydroxyl reaction, the catalytically active material must be applied evenly throughout the active layer and the carbon layer contained therein.

We claim:

1. A method of making an air cathode material for an electrochemical metal-air cell, comprising the steps of:
    (a) combining potassium permanganate and water to form an aqueous potassium permanganate solution;
    (b) mixing carbon particles into the aqueous potassium permanganate solution to form a reaction mixture;
    (c) reacting the mixture at room temperature for sufficient time to permit the potassium permanganate compounds to react therein with the carbon particles and thereby to form a reaction product of water, carbon particles, and manganese compounds substantially all of valence state +2, and
    (d) drying the reaction product to yield the air cathode material.

2. A method as in claim 1, wherein the drying step includes heating the reaction product at temperatures between about 100° C. and 140° C.

3. A method as in claim 1, wherein the mixing step is carried out for at least five minutes.

4. A method as in claim 1, wherein the mixing step further comprises adding a dispersant to the reaction mixture.

5. A method of making an air cathode layer for an electrochemical metal-air cell, comprising the steps of:
    (a) combining potassium permanganate and water to form an aqueous potassium permanganate solution;
    (b) mixing carbon particles into the aqueous potassium permanganate solution to form a reaction mixture;
    (c) reacting the mixture at room temperature for sufficient time to permit the potassium permanganate compounds to react therein with the carbon particles and thereby to form a reaction product of water, carbon particles, and manganese compounds substantially all of valence state +2;
    (d) filtering the reaction product to produce a filtered reaction product;
    (e) heating the filtered reaction product until a dry cake is produced;
    (f) recovering, as a cathode material, a solid reaction product so produced;
    (g) mixing the cathode material at about 2600 rpm and a temperature between about 80° C. and 100° C. for about 30 minutes until the cathode material becomes free-flowing;
    (h) rolling the cathode material into an active layer sheet between about 0.007 and 0.015 inches thick, the active layer sheet having first and second sides;
    (i) laminating a current collecting substrate sheet onto the first side of the active layer sheet by pressing the current collecting substrate sheet into the active layer sheet;
    (j) laminating a barrier sheet onto the first side of the active layer sheet, and
    (k) laminating an air diffusion layer sheet onto the second side of the active layer sheet.

* * * * *